(12) United States Patent
Manteiga et al.

(10) Patent No.: US 6,607,165 B1
(45) Date of Patent: Aug. 19, 2003

(54) AIRCRAFT ENGINE MOUNT WITH SINGLE THRUST LINK

(75) Inventors: John Alan Manteiga, North Andover, MA (US); Christopher James Wilusz, Peabody, MA (US); Cornelius Harm Dykhuizen, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/185,922

(22) Filed: Jun. 28, 2002

(51) Int. Cl.[7] .............................................. B54D 27/00
(52) U.S. Cl. ........................ 244/54; 60/39.31; 248/554
(58) Field of Search ................................ 244/54, 53 R, 244/55; 60/39.31; 248/554, 555

(56) References Cited

U.S. PATENT DOCUMENTS

| | | | |
|---|---|---|---|
| 4,266,741 A | | 5/1981 | Murphy ........................ 244/54 |
| 4,603,821 A | | 8/1986 | White ........................... 244/54 |
| 5,725,181 A | * | 3/1998 | Hey .............................. 244/54 |
| 5,746,391 A | | 5/1998 | Rodgers et al. ................ 244/54 |
| 5,860,623 A | * | 1/1999 | Dunstan et al. ................ 244/54 |
| 5,873,547 A | * | 2/1999 | Dunstan ........................ 244/54 |
| 5,921,500 A | * | 7/1999 | Ellis et al. ..................... 244/54 |
| 6,330,985 B1 | * | 12/2001 | Manteiga et al. .............. 244/54 |
| 2002/0104924 A1 | * | 8/2002 | Roszak .......................... 244/54 |

* cited by examiner

Primary Examiner—J. Woodrow Eldred
(74) Attorney, Agent, or Firm—Nathan D. Herkamp; Pierce Atwood

(57) ABSTRACT

A mount for mounting an aircraft engine to an aircraft includes a mounting frame having first and second flanges spaced apart a predetermined distance. Each of the first and second flanges has a bolt hole formed therein. A single thrust link is connected at one end to the mounting frame and at another end to the engine and serves as the primary axial loadpath for the engine. A lug formed on the engine casing is disposed between the first and second flanges and has a thickness that is less than the distance between the first and second flanges. The lug also has a bolt hole formed therein. A bolt extends through the bolt holes in the first and second flanges and the lug to connect the lug to the first and second flanges. The bolt hole in the lug is larger in diameter than the bolt to allow the lug to slide axially along the bolt. The first and second flanges, the lug and the bolt provide a waiting failsafe arrangement for reacting axial loads upon failure of the single thrust link.

21 Claims, 5 Drawing Sheets

AIRCRAFT ENGINE MOUNT WITH SINGLE THRUST LINK

BACKGROUND OF THE INVENTION

This invention relates generally to aircraft engines and more particularly to mounts for supporting an engine on an aircraft.

An aircraft engine may be mounted to an aircraft at various locations such as the wings, fuselage or tail. The engine is typically mounted at both its forward and aft ends by corresponding forward and aft mounts for carrying various loads to the aircraft. The loads typically include vertical loads such as the weight of the engine itself, axial loads due to the thrust generated by the engine, lateral loads such as those due to wind buffeting, and roll loads or moments due to rotary operation of the engine. The mounts must also accommodate both axial and radial thermal expansion and contraction of the engine relative to the supporting pylon.

One exemplary mounting system includes a forward mount having a pair of circumferentially spaced apart links. Each link is joined at one end to the aircraft and at the other end to a casing in the engine. The links transfer in-plane loads, i.e. those in a single vertical axial plane extending perpendicularly to the engine centerline axis, from the engine to the aircraft through tension and compression thereof. The mount can thus accommodate vertical loads and lateral or horizontal loads.

The exemplary mounting system further includes an aft mount, having a pair of circumferentially spaced apart links. Each of these links is also joined at one end to the aircraft and at the other end to an engine casing. The aft mount further includes a pair of thrust links for reacting thrust generated by the engine. Each thrust link is joined at one end to the aircraft and is joined at the other end to engine casing. The two ends are spaced axially with respect to the engine such that the links react engine thrust in compression or tension. This system utilizes two thrust links to provide thrust loadpath failsafe protection. That is, if the loadpath of one of the two thrust links becomes damaged, the other thrust link picks up the entire thrust load. While generally operating in a satisfactory manner, this system requires two thrust links, two thrust yokes, a thrust balancing whiffle tree, additional lug joints and associated hardware. This results in a relatively complex mounting system having a large number of parts, high cost and increased weight penalty. Accordingly, it would be desirable to have an aircraft engine mount that is able to provide thrust loadpath failsafe protection without using two thrust links.

BRIEF SUMMARY OF THE INVENTION

The above-mentioned need is met by the present invention, which provides an aircraft engine mount including a mounting frame having first and second flanges spaced apart a predetermined distance. Each of the first and second flanges has a bolt hole formed therein. A single thrust link is connected at one end to the mounting frame and at another end to the engine and serves as the primary axial loadpath for the engine. A lug formed on the engine casing is disposed between the first and second flanges and has a thickness that is less than the distance between the first and second flanges. The lug also has a bolt hole formed therein. A bolt extends through the bolt holes in the first and second flanges and the lug to connect the lug to the first and second flanges. The bolt hole in the lug is larger in diameter than the bolt to allow the lug to slide axially along the bolt. The first and second flanges, the lug and the bolt provide a waiting failsafe arrangement for reacting axial loads upon failure of the single thrust link.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
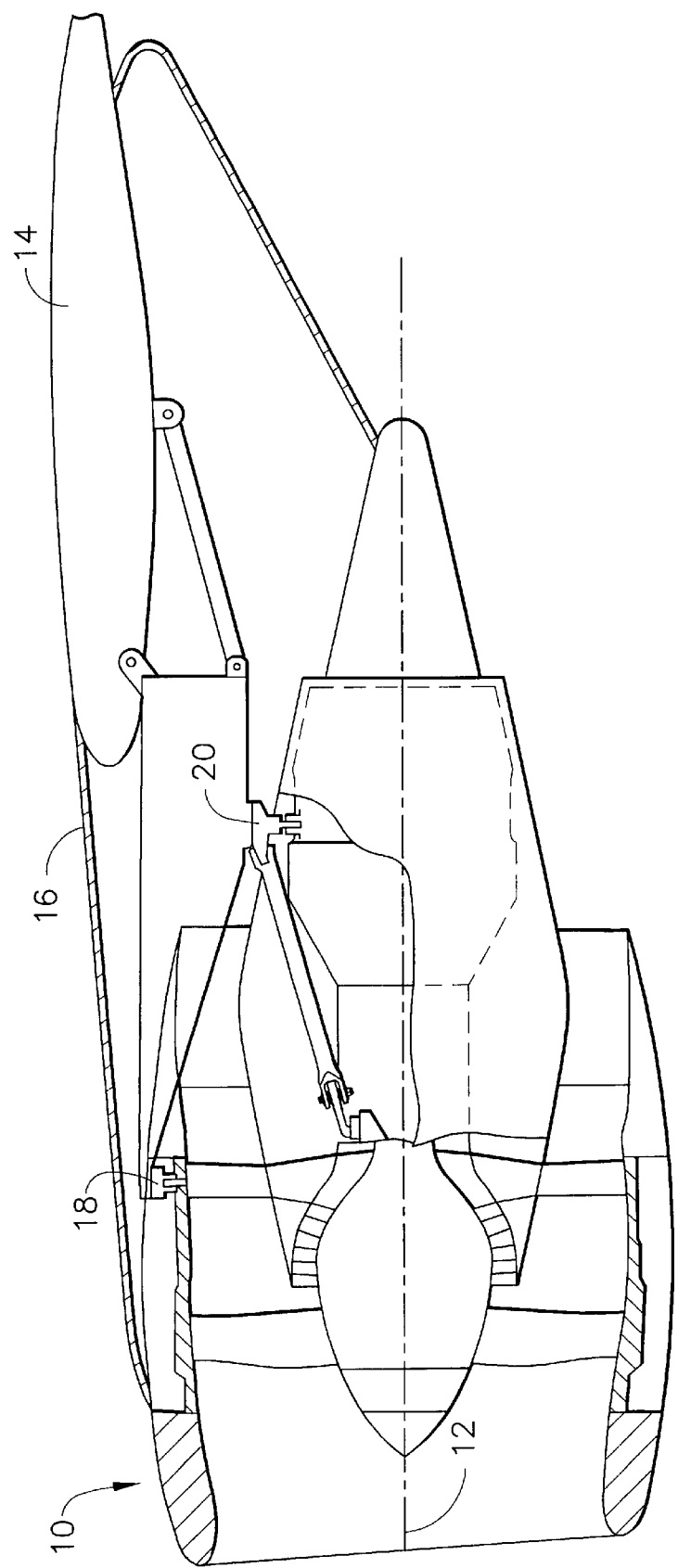
FIG. 1 is a schematic side view of an aircraft engine mounting system.

Referring to the drawings wherein identical reference numerals denote the same elements throughout the various views, FIG. 1 schematically shows an exemplary turbofan gas turbine engine 10 having a longitudinal or axial centerline axis 12 mounted below an aircraft wing 14. The wing 14 includes a pylon 16, and the engine 10 is mounted to the pylon 16 by a mounting system comprising a forward mount 18 and an aft mount 20 spaced axially downstream from the forward mount 18. Although the engine 10 is shown as being mounted in a top mounted installation, this is only for purposes of illustration. It will be understood from the following description that the present invention is equally applicable to mounting system components that are used in any type of engine installation, including side mounted and bottom mounted installations. Accordingly, the present invention is not limited to wing-mounted engines, but can also be used with fuselage and tail-mounted engines. Furthermore, the present invention is not limited to turbofan engines, but can be used with other types of engines such as turboshaft and turboprop engines.

Figure 2:
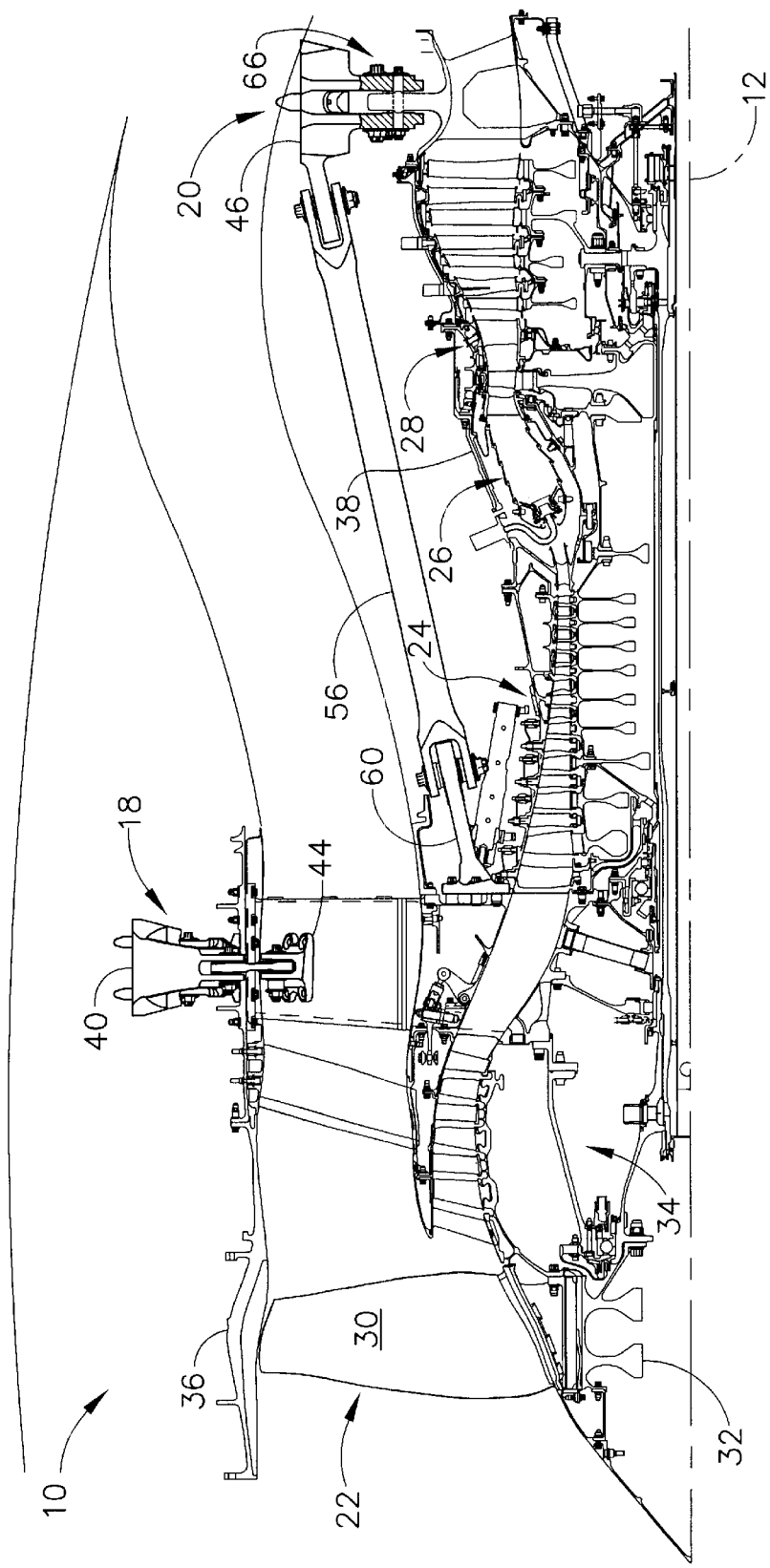
FIG. 2 is an axial cross-sectional view showing the mounting system of FIG. 1 in more detail.

FIG. 2 shows the gas turbine engine 10 in more detail. As is known in the art, the engine 10 includes a fan section 22, a compressor section 24, a combustor section 26 and a turbine section 28, arranged in order, in axial flow relationship. The compressor section 24, combustor section 26 and turbine section 28 are commonly referred to collectively as the core engine. A portion of the air entering the engine 10 passes through the fan section 22 and the compressor section 24, and is pressurized in each section. The compressed air exiting the compressor section 24 enters the combustor section 26 where it is mixed with fuel and burned to provide a high energy gas stream. This high energy gas stream is expanded in the turbine section 28. The energy extracted by the expansion of the high energy gas stream in the turbine section 28 is used to drive the fan section 22 and the compressor section 24. The remainder of the air flow entering the engine 10 passes through the fan section 22, but bypasses the core engine, and produces a large portion of the engine thrust.

The fan section 22 includes a plurality of fan blades 30 (one shown in FIG. 2) that extend radially outwardly from a rotor disk 32. The rotor disk 32 is rotatively supported on a stationary front frame 34 (also known as a fan frame). The front frame 34 includes an annular fan casing 36 that surrounds the fan section 12. A core engine casing 38 surrounds the core engine.

Figure 3:
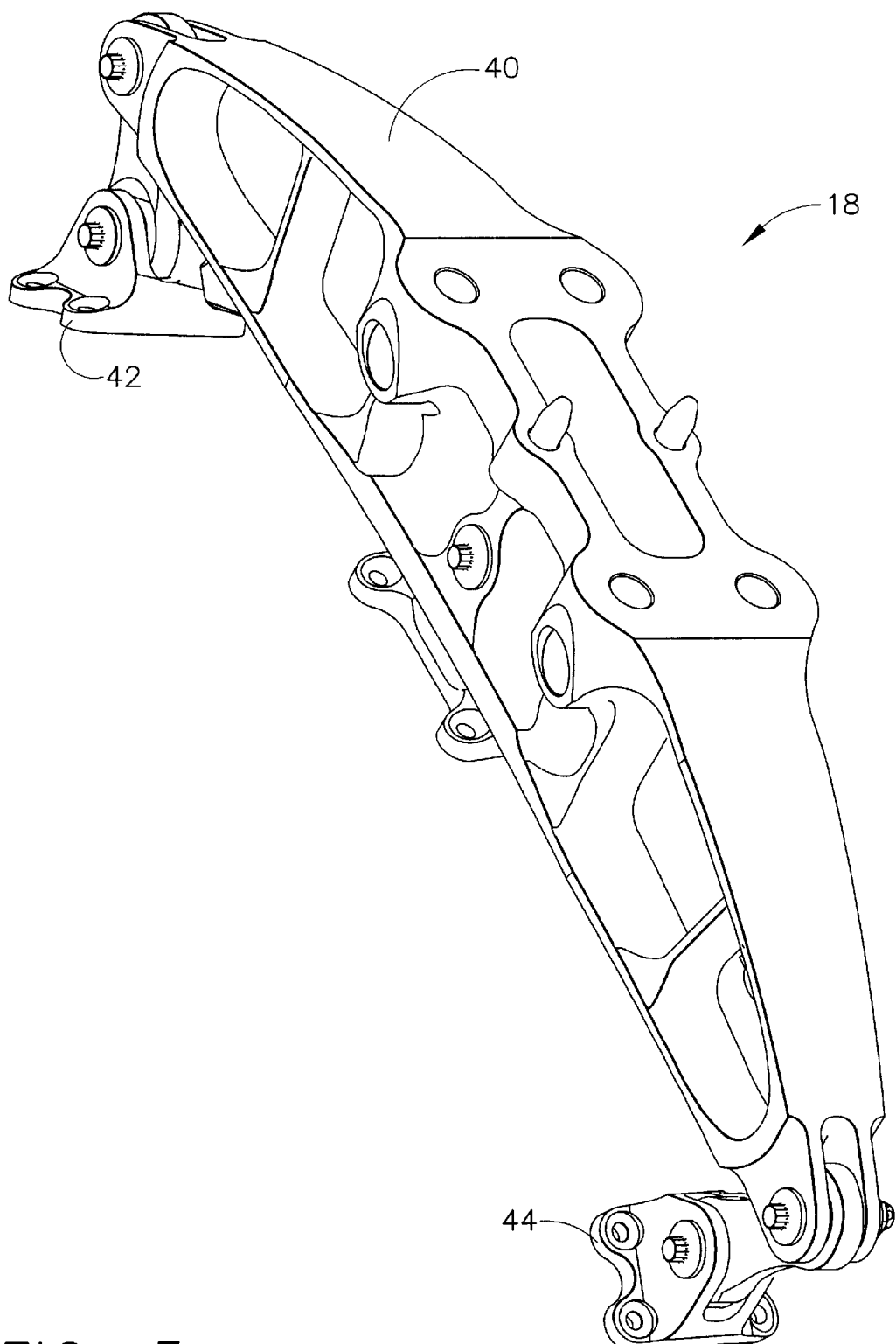
FIG. 3 is a perspective view of the forward mount from the mounting system of FIG. 1.

As seen best in FIGS. 2 and 3, the forward mount 18 includes a mounting frame 40 that is fixedly joined to the pylon 16 by conventional means such as bolts. A first triangular clevis 42 is pivotally joined to one end of the forward mounting frame 40, and a second triangular clevis 44 is pivotally joined to the other end of the forward mounting frame 40. The first triangular clevis 42 is fixedly joined to the fan casing 36 at a first location, and the second triangular clevis 44 is fixedly joined to the fan casing 36 at a second location which is spaced circumferentially from the first location.

Figure 4:
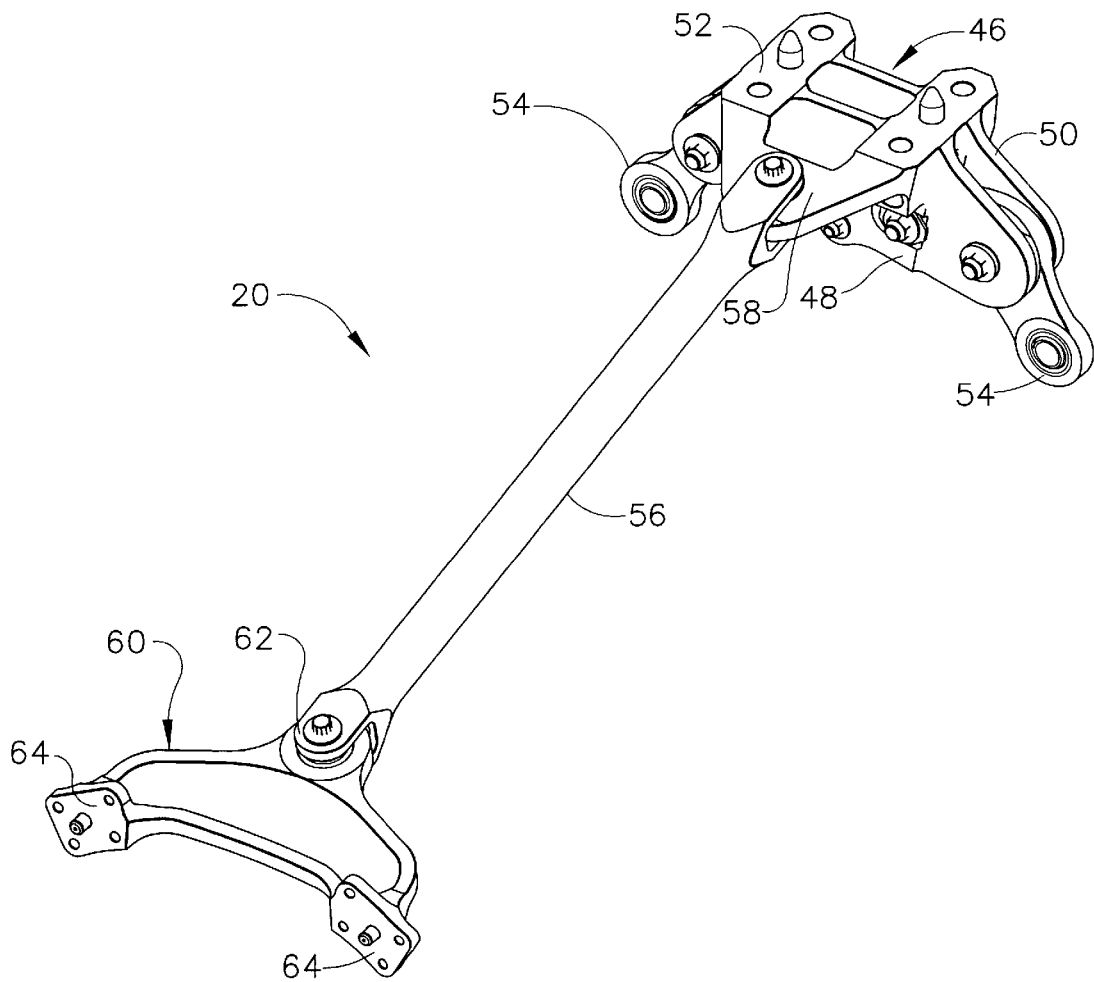
FIG. 4 is a perspective view of the aft mount from the mounting system of FIG. 1.

As seen best in FIGS. 2 and 4, the aft mount 20 includes a mounting frame 46 that is also fixedly joined to the pylon 16 by conventional means such as bolts. The aft mounting frame 46 includes first and second axially spaced flanges 48 and 50 extending downwardly from a pylon interface section 52. The two flanges 48 and 50 are arranged side-by-side to define a clevis. Two links 54 are used to join the engine 10 to the aft mounting frame 46. Specifically, each link 54 is joined at one end to the aft mounting frame 46 (between the flanges 48 and 50) and is joined at the other end to the core engine casing 38. The two links 54 are each inclined from a tangent to the core engine casing 38, in the vertical or axial plane, in opposite directions to one another. In this way, the links 54 straddle the core engine casing 38 generally symmetrically with respect to the engine centerline axis 12. Engine vertical, lateral and roll loads are thus reacted through the links 54.

The aft mount 20 further includes a single thrust link 56 for reacting thrust generated by the engine 10. The thrust link 56 is joined at one end to a forward extending flange 58 on the aft mounting frame 46 and is joined at the other end to the front frame 34 via a thrust yoke 60. The thrust yoke 60 includes a central flange 62 for attaching to the end of the thrust link 56 and two mounting pads 64 that are fixedly joined to the front frame 34 by conventional means such as bolts. The aft mount 20 also includes a waiting failsafe arrangement 66 (FIG. 2). The waiting failsafe arrangement 66 does not normally bear axial loads, but is provided solely for reacting axial loads upon failure of the thrust link 56, which is the primary axial loadpath.

Figure 5:
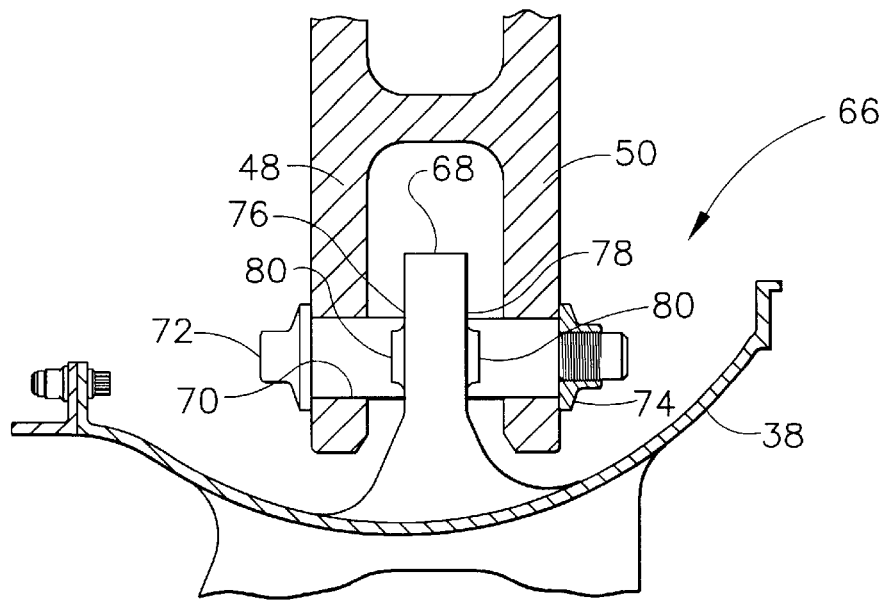
FIG. 5 is an enlarged axial cross-sectional view showing a waiting failsafe arrangement from the aft mount in detail.
Figure 6:
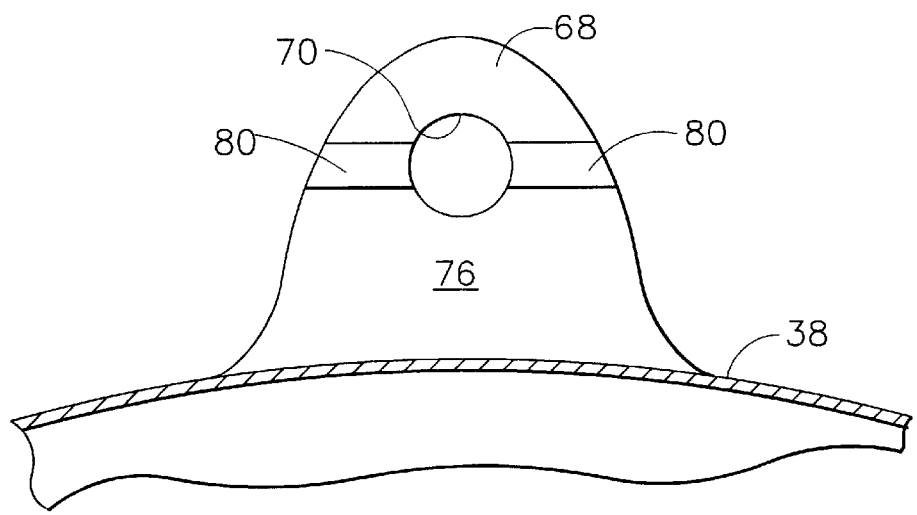
FIG. 6 is a forward-looking-aft view of an engine lug from the waiting failsafe arrangement.

Referring now to FIGS. 5 and 6, the waiting failsafe arrangement 66 includes a single lug 68 formed on the outer surface of the core engine casing 38 and extends radially outward. The lug 68 and is disposed between the flanges 48 and 50 and is circumferentially aligned with the middle of the flanges 48 and 50 so as to be centered between the two links 54. Each flange 48 and 50 has a bolt hole formed therein, and the lug 68 has a bolt hole 70 formed therein that is aligned with the flange bolt holes. A bolt 72 extends through the flanges and the lug bolt hole 70 for connecting the lug 68 to the flanges 48 and 50. The bolt 72 is retained by a nut 74 threaded thereon. This nut-and-bolt arrangement generally secures the lug 68 relative to the aft mounting frame 46, although the bolt hole 70 is slightly larger than the outside diameter of the bolt 72 so as to allow the lug 68 to slide axially (forward or aft) along the bolt 72.

The lug 68 has a forward surface 76 facing the first flange 48 and an aft surface 78 facing the second flange 50. Lands 80 are formed on both the forward and aft surfaces 76, 78. As seen best in FIG. 6, the lands 80 are located adjacent to the bolt hole 70, although the lands 80 are not limited to this location on the lug 68 for reasons that will become clear. The height of the lands 80 is such that the lug 68 has a predetermined overall thickness at the lands 80 that is less than the distance between the two flanges 48 and 50. This results in nominal axial gaps between each flange 48 and 50 and the corresponding land 80 that prevent inadvertent axial or thrust loading of the waiting failsafe arrangement 66 when the primary thrust loadpath (i.e., the single thrust link 56) is functioning. In the event of failure of the thrust link 56 during engine operation, the engine 10 will translate forward until the lug 68 contacts the forward flange 48 and the forward axial gap is closed. The forward thrust load is then transmitted from the engine lug 68 to the forward flange 48 and to the aircraft pylon 16. During a landing when reverse engine thrust is employed, the engine 10 will translate aftward until the lug 68 contacts the aft flange 50 and the aft axial gap is closed. The reverse thrust load is then transmitted from the engine lug 68 to the aft flange 50 and to the aircraft pylon 16.

The lug 68 is designed to withstand the axial loads that will be generated by the engine thrust. To this end, the lug 68 is tapered (as seen best in FIG. 5) so as to be thicker at its base than at its distal end. Providing the lug 68 with a thicker, tapered base increases its bending resistance. The inside corners of the two flanges 48 and 50 are chamfered to provide clearance between the tapered portion of the lug 68 and the flanges 48 and 50. This assures that contact between the lug 68 and either flange 48, 50 will only occur at the lands 80. Thus, use of the lands 80 allows the designer of a particular mounting system to know exactly where along its radial length the lug 68 will contact either flange 48, 50. This permits the designer to reliably calculate the bending stress or moment arm that the lug 68 will be subjected to for a given thrust load. Accordingly, the lug 68 can be designed to have sufficient strength to withstand expected thrust loads.

The foregoing has described an aircraft engine mounting that provides thrust loadpath failsafe protection while having only one thrust link. The mounting system reduces overall part count and complexity, which results in significant weight and cost savings. Another benefit of the present invention is a reduction in engineering time and cost to design and analyze the mounting system. While specific embodiments of the present invention have been described, it will be apparent to those skilled in the art that various modifications thereto can be made without departing from the spirit and scope of the invention as defined in the appended claims.

What is claimed is:

1. A mount for mounting an aircraft engine having an engine casing to an aircraft, said mount comprising:
   a mounting frame having first and second flanges spaced apart a predetermined distance;
   a lug formed on said engine casing, said lug being disposed between said first and second flanges and having a thickness that is less than said distance between said first and second flanges; and
   a bolt connecting said lug to said first and second flanges, wherein said lug is capable of sliding axially along said bolt.

2. The mount of claim 1 further comprising a single thrust link connected at one end to said mounting frame and at another end to said engine.

3. The mount of claim 1 wherein said lug has a land formed on a first surface thereof and another land formed on a second surface thereof.

4. The mount of claim 3 wherein said first surface faces said first flange and said second surface faces said second flange.

5. The mount of claim 1 wherein said bolt extends through a bolt hole formed in said lug, said bolt hole being larger in diameter than said bolt.

6. The mount of claim 5 wherein said lug has a land formed on a first surface thereof and another land formed on a second surface thereof.

7. The mount of claim 6 wherein said lands are adjacent to said bolt hole.

8. The mount of claim 1 wherein said lug is tapered so as to have a thicker base.

9. The mount of claim 8 wherein each flange has an inside corner that is chamfered to accommodate said tapered lug.

10. A mount for mounting an aircraft engine having an engine casing to an aircraft, said mount comprising:
    a mounting frame having first and second flanges spaced apart a predetermined distance, each of said first and second flanges having a bolt hole formed therein;
    a single thrust link connected at one end to said mounting frame and at another end to said engine, said single thrust link serving as a primary axial loadpath;
    a lug formed on said engine casing, said lug being disposed between said first and second flanges and having a thickness that is less than said distance between said first and second flanges, said lug having a bolt hole formed therein; and
    a bolt extending through said bolt holes in said first and second flanges and said lug to connect said lug to said first and second flanges, wherein said bolt hole in said lug is larger in diameter than said bolt to allow said lug to slide axially along said bolt, wherein said first and second flanges, said lug and said bolt provide a waiting failsafe arrangement for reacting axial loads upon failure of said single thrust link.

11. The mount of claim 10 wherein said lug has a land formed on a first surface thereof and another land formed on a second surface thereof.

12. The mount of claim 11 wherein said first surface faces said first flange and said second surface faces said second flange.

13. The mount of claim 11 wherein said lands are adjacent to said bolt hole.

14. The mount of claim 10 wherein said lug is tapered so as to have a thicker base.

15. The mount of claim 14 wherein each of said first and second flanges has an inside corner that is chamfered to accommodate said tapered lug.

16. A mount for mounting an aircraft engine having an engine casing to an aircraft, said mount comprising:
    a mounting frame fixedly joined to said aircraft; said mounting frame having first and second flanges spaced apart a predetermined distance and a forward extending flange, each of said first and second flanges having a bolt hole formed therein;
    first and second links, each link being joined at one end to said mounting frame and at another end to said engine casing;
    a single thrust link connected at one end to said forward extending flange and at another end to said engine, said single thrust link serving as a primary axial loadpath;
    a lug formed on said engine casing, said lug being disposed between said first and second flanges and having a thickness that is less than said distance between said first and second flanges, said lug having a bolt hole formed therein; and
    a bolt extending through said bolt holes in said first and second flanges and said lug to connect said lug to said first and second flanges, wherein said bolt hole in said lug is larger in diameter than said bolt to allow said lug to slide axially along said bolt, wherein said first and second flanges, said lug and said bolt provide a waiting failsafe arrangement for reacting axial loads upon failure of said single thrust link.

17. The mount of claim 16 wherein said lug has a land formed on a first surface thereof and another land formed on a second surface thereof.

18. The mount of claim 17 wherein said first surface faces said first flange and said second surface faces said second flange.

19. The mount of claim 17 wherein said lands are adjacent to said bolt hole.

20. The mount of claim 16 wherein said lug is tapered so as to have a thicker base.

21. The mount of claim 20 wherein each of said first and second flanges has an inside corner that is chamfered to accommodate said tapered lug.

* * * * *